US012722732B2

(12) United States Patent
Sudarshan et al.

(10) Patent No.: US 12,722,732 B2
(45) Date of Patent: Sep. 1, 2026

(54) MULTI-FACETED DASHBOARD ASSEMBLY OF A VEHICLE

(71) Applicant: TVS MOTOR COMPANY LIMITED, Chennai (IN)

(72) Inventors: Venu Sudarshan, Chennai (IN); Jabez Dhinagar Samraj, Chennai (IN); Geddadi Krishnamohan, Chennai (IN); Subbiah Senthilnathan, Chennai (IN); Venkatachalapathi Aravindh Balaji, Chennai (IN)

(73) Assignee: TVS Motor Company Limited, Chennai (IN)

( * ) Notice: Subject to any disclaimer, the term of this patent is extended or adjusted under 35 U.S.C. 154(b) by 594 days.

(21) Appl. No.: 18/039,435

(22) PCT Filed: Mar. 25, 2021

(86) PCT No.: PCT/IN2021/050311
§ 371 (c)(1),
(2) Date: May 30, 2023

(87) PCT Pub. No.: WO2022/107153
PCT Pub. Date: May 27, 2022

(65) Prior Publication Data
US 2024/0002004 A1 Jan. 4, 2024

(30) Foreign Application Priority Data
Nov. 18, 2020 (IN) ............................. 202041050088

(51) Int. Cl.
*B60R 25/00* (2013.01)
*B60K 35/10* (2024.01)
(Continued)

(52) U.S. Cl.
CPC ............. *B62J 17/086* (2020.02); *B60K 35/10* (2024.01); *B60K 35/22* (2024.01); *B60K 35/53* (2024.01);
(Continued)

(58) Field of Classification Search
CPC . B62J 17/086; B62J 50/22; B62J 50/23; B62J 50/225; B60K 35/10; B60K 35/22;
(Continued)

(56) References Cited

U.S. PATENT DOCUMENTS 7,510,229 B2 * 3/2009 Katagiri ................... B62J 29/00 296/180.1
8,899,668 B2 * 12/2014 Yokouchi ................ B62J 17/10 296/180.1
(Continued)

FOREIGN PATENT DOCUMENTS

EP 2289788 A1 * 3/2011 ............ B62J 50/225
JP 2022021383 * 2/2022 .............. B62J 45/40
WO WO-2008068364 A1 * 6/2008 .............. B62J 17/04

OTHER PUBLICATIONS

International Search Report issued in corresponding International Application No. PCT/IN2021/050311 mailed Sep. 14, 2021 (4 pages).
(Continued)

*Primary Examiner* — Tai T Nguyen
(74) *Attorney, Agent, or Firm* — Osha Bergman Watanabe & Burton LLP

(57) ABSTRACT

A multi-faceted dashboard assembly (107) of a vehicle with a visor assembly and a display assembly is disclosed. The visor assembly (106) slidably engages with a handle bar cover (101) of the vehicle. The display assembly (105) comprising at least one display face (105*a*, 105*b*) is accommodated in a cavity (101*a*) of the handle bar cover (101).
(Continued)

The display assembly (105) is one of stationary and rotatable from 0 degrees to about 360 degrees.

33 Claims, 12 Drawing Sheets

(51) Int. Cl.

| | |
|---|---|
| ***B60K 35/22*** | (2024.01) |
| ***B60K 35/53*** | (2024.01) |
| ***B60K 35/60*** | (2024.01) |
| ***B62H 5/00*** | (2006.01) |
| ***B62J 17/086*** | (2020.01) |
| ***B62J 50/22*** | (2020.01) |
| ***B62J 50/23*** | (2020.01) |
| ***B62K 11/14*** | (2006.01) |

(52) U.S. Cl.
CPC ............... *B60K 35/60* (2024.01); *B62H 5/00* (2013.01); *B62J 50/22* (2020.02); *B62J 50/23* (2020.02); *B62K 11/14* (2013.01)

(58) Field of Classification Search
CPC .. B60K 35/53; B60K 35/60; B60K 2360/685; B60K 2360/693; B60K 2360/816; B60K 2360/834; B60K 2360/84; B60K 37/20; B62H 5/00; B62K 11/14
USPC .......................................................... 340/427
See application file for complete search history.

(56) References Cited

U.S. PATENT DOCUMENTS

| | | | | |
|---|---|---|---|---|
| 9,334,005 | B2 * | 5/2016 | Horiuchi | B62K 19/46 |
| 2009/0195011 | A1 * | 8/2009 | Tsuda | B62J 17/04 296/78.1 |
| 2014/0203594 | A1 * | 7/2014 | Tsukui | B60J 1/02 296/192 |
| 2015/0266532 | A1 * | 9/2015 | Horiuchi | B62K 21/12 180/219 |
| 2017/0267304 | A1 * | 9/2017 | Nakano | B62J 17/04 |

OTHER PUBLICATIONS

Written Opinion of the International Searching Authority issued in corresponding International Application No. PCT/IN2021/050311 mailed Sep. 14, 2021 (7 pages).

* cited by examiner

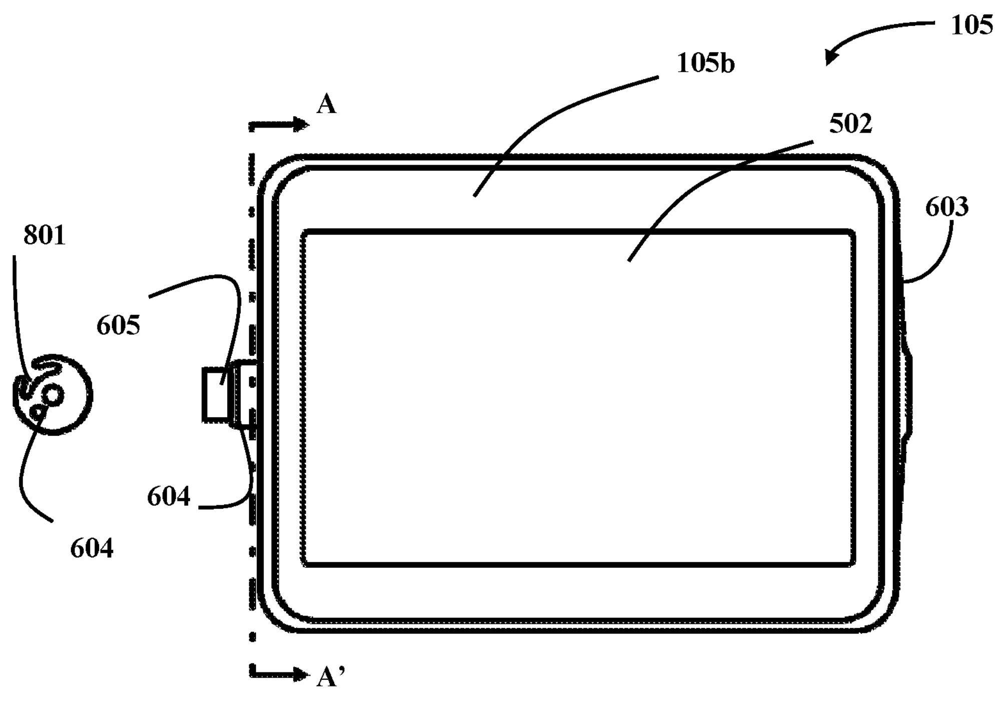
Fig. 8A
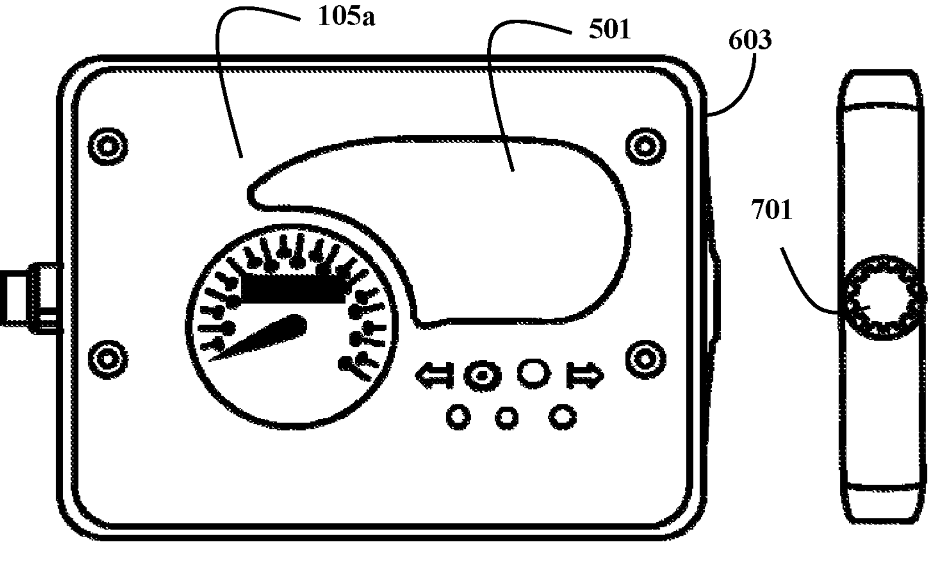
Fig. 8B
Fig. 8C

MULTI-FACETED DASHBOARD ASSEMBLY OF A VEHICLE

TECHNICAL FIELD

The present subject matter relates to a dashboard assembly of a vehicle. More particularly, a multi-faceted dashboard assembly with varied capabilities is disclosed.

BACKGROUND

A vehicle, generally a two wheeled vehicle or a three wheeled vehicle is equipped with a dashboard assembly that is positioned proximal to a handle bar or a steering wheel of the vehicle. The dashboard assembly may comprise plurality of systems e.g. various meters conveying the information of the vehicle, means to lock and unlock the vehicle, a visor, etc. In addition to the visor, the vehicle may have a windshield affecting the aerodynamics of the vehicle. The meter on the dashboard assembly is positioned in the viewing direction of the rider of the vehicle to display information and receive inputs from the user. With the advent of technology, the means to convey vehicle information to the rider is evolving and thus, the components of the dashboard assembly are no longer limited to analog meters. The analog meters have evolved to become digital meters, electronic display units, LCD panels, etc., and the meter visor is needed to protect these display means of the dashboard assembly. Thus, the design of the evolving multi-faceted multi-capability dashboard assembly of the vehicle is critical to the readability, accessibility, and informative display to the rider of the vehicle resulting in ride comfort, convenience, and ease of usage of the vehicle.

BRIEF DESCRIPTION OF THE DRAWINGS

FIGS. 8A-8C exemplarily illustrate different views of an embodiment of the display assembly;

DETAILED DESCRIPTION OF THE INVENTION

Figure 1A:
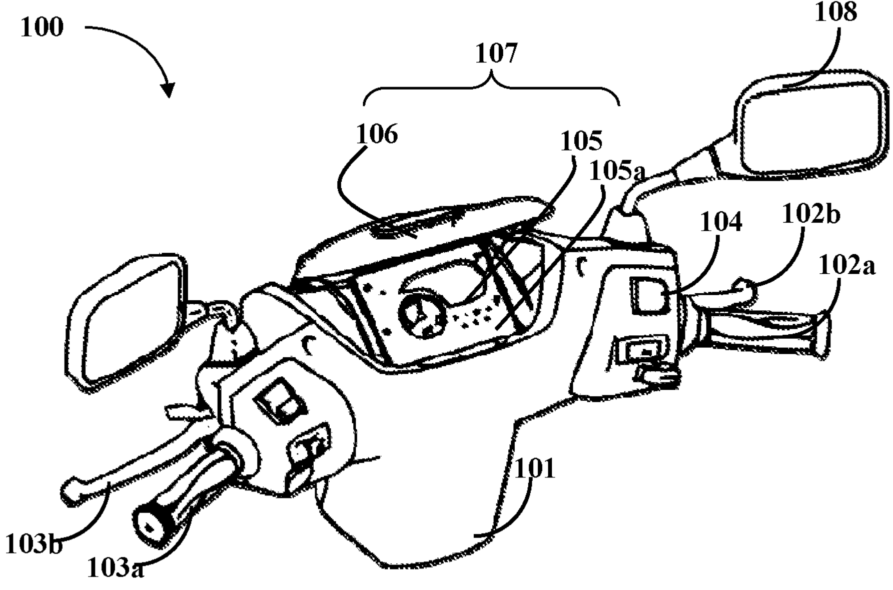
FIGS. 1A-1C exemplarily illustrate perspective views of a handle bar assembly of a vehicle.

Analog meters or the display units in the dashboard assembly conveying information, such as, speed of the vehicle, fuel tank level, battery level, distance travelled, etc., are positioned in a direction facing the rider of the vehicle. During the course of the ride, the meters or the display units are exposed to sunlight, dust, and rain and visibility of the vehicle information on the dashboard assembly is reduced. The display unit may be subjected to glare due to the sunlight and readability will be reduced. Also, during the vehicle parked condition, the continuous prolonged exposure of the display units and the analog meters to high intensity sunlight may damage them. Additionally, the existing visor of the vehicle is fixed to the frame of the vehicle and is designed to protect the rider from direct contact with traveling wind, reduce aerodynamic drag resistance, and protect the meters from flying insects, gravel, and rain only to a limited extent. Without proper protection to the meters and the display units, the readability of the vehicle information is hampered, leading to a mishap or untoward incident. Thus, there is a need to protect the meters and the display units from prolonged exposure to sun in parked condition.

To address this need, a solution could involve providing a cover on the meters and the display units, while parking the vehicle. However, the cover needs to be retracted or docked elsewhere during the course of ride of the vehicle, as the meters and the display units ought to be visible to the rider. Also, if the cover is provided in addition to the visor behind the display units, the number of the mountings on the frame of the vehicle increase. To make place for the visor and the cover on the same frame member, the meters and the display units will have to be positioned more closer to the rider, hindering readability of the meters and the display unit by the rider. Further, if the cover is to be used to partially cover the meters and the display units to avoid glare, the cover needs to be docked at different adjustable positions based on the comfort of the user. However, this would require additional manual intervention by the user during the course of the ride, distracting the rider and may lead to a mishap. Therefore, there is a need for a design of a multi-functional visor of the vehicle that serves the purpose of a visor and a cover on the meters and the display unit, while not involving any manual intervention by the rider.

Also, the layout of the meters and the display units is generally flat requiring the user to sometimes bend and have a glance of the information being conveyed. This distracts the rider in the course of driving the vehicle. There is a need for the display units and the meters to be positioned ergonomically, catering to riders of different genders and heights providing ease in readability by being in the riders cone of vision and accessible within anthropometric reach. Further, the layout of the dashboard assembly needs to be discrete and neat for conveying different kinds of information to the riders. The information conveyed by the analog meters, such, speed, fuel tank level, etc., is different from the information conveyed by the digital display unit, such as, call records, mode of the vehicle, etc. The combination of the analog meters and the display units together tends to distract the rider. Also, the preferences of the riders tend to vary, with the older generation being comfortable with minimum information for a safe ride and the younger generation craving for additional features in the form of display units which is also substantiated by rider age based cognitive abilities to comprehend and process diverse set of simultaneous information being displayed. There is a need for the design of the dashboard assembly to cater to the preferences of different generations, genders by making the display of the information neat and non-clumsy. Further, there is a need for conveying vehicle information to the rider during the ride and a need for providing entertainment to the rider during the vehicle parked condition using the meters and the display unit.

Therefore, there is a need for an improved design of a multi-faceted ergonomic modular dashboard assembly comprising meters, display units, and a visor in a vehicle that ensures protected discrete and neat display of information, based on rider preferences, while also ensuring rider comfort, convenience, safety, readability, and accessibility, overcoming all problems disclosed above as well as other problems of known art.

In an embodiment, a multi-faceted dashboard assembly of a vehicle comprising a visor assembly and a display assembly is disclosed. The visor assembly slidably engages with a handle bar cover of the vehicle and the display assembly is accommodated in a compact cavity of the handle bar cover. The display unit comprises at least one display face The visor assembly comprises at least one visor of a predetermined profile for at least partially covering or at least partially exposing the display assembly and at least one extension means extending from a rear surface of the visor for engaging with at least one guide rail on a top surface of the handle bar cover.

In an embodiment, the visor assembly further comprises a first coupling means extending from the rear surface of the visor and engaging with a first end of a second coupling means and a drive motor removably attached to a rear surface of the handle bar cover and engaging with a second end of the second coupling means for driving the visor over the at least one guide rail.

In another embodiment, the visor assembly further comprises a first end of each of at least two linkage members connected to connection means on the rear surface of the visor, a third coupling means operably engaged with a second end of the each of the at least two linkage members connecting for applying actuating force on the at least two linkage members, and a drive motor removably attached to a rear surface of the handle bar cover and engaging with the third coupling means for driving the visor over the at least one guide rail using the at least two linkage members.

In a third embodiment, the visor assembly further comprises at least one linkage member for pivotably attaching the visor to the handle bar cover, and a drive motor removably attached to a rear surface of the handle bar cover and engaging with the at least one linkage member for driving the visor over the at least one guide rail.

In all the embodiments, the drive motor is actuated by at least one of an input switch on the handle bar cover, an input in a user application, a voice command to the visor, and a voice command to the display assembly. According to an embodiment, the visor of the visor assembly comprises a first display unit displaying at least one of a status of the vehicle and a logo of the vehicle. In another embodiment, the visor of the visor assembly comprises a contactless communication card for authorised entry to the vehicle.

The display assembly comprises a support frame positioned within the cavity of the handle bar cover, at least one display face removably attached to the support frame, and a drive motor rotatably engaged with the support frame to drive the support frame in the cavity of the handle bar cover. The drive motor of the display assembly is actuated by at least one of an input switch on the handle bar cover, an input in a user application connected to the vehicle, a voice command to the visor, and a voice command to the display assembly.

The display assembly comprises a cable router on at least one side of the support frame for routing a plurality of cables extending from the at least one display face of the support frame, and a closure member removably attached to the cable router for sealing the plurality of cables. At least one display face is an analog instrument panel, a digital instrument panel, an electronic instrument cluster, an infotainment unit, and a vehicle body element. At least one display face is configured in one of flush and offset manner with a top surface of the handle bar cover. In the embodiment with the at least one display face being offset from the top surface of the handle bar cover, a guiding and sealing member is positioned proximal to edges of the cavity of the handle bar cover.

In an embodiment, the display assembly is accommodated in a cavity of a display enclosure, and the display enclosure is removably attached to the handle bar cover. The display enclosure comprises the at least one guide rail on a top surface and wherein the visor assembly slidably engages with the display enclosure. The display assembly is configured in one of stationary and rotatable manner rotatable from 0 degrees to about 360 degrees.

According to second embodiment of the present invention, a visor assembly of a vehicle is disclosed. The visor assembly slidably engages with a handle bar cover of the vehicle. The visor assembly comprises at least one visor of a predetermined profile for one of covering and exposing a display assembly positioned in a handle bar cover, and at least one extension means extending from a rear surface of the visor for engaging with at least one guide rail on a top surface of the handle bar cover. The visor assembly comprises a first coupling means extending from the rear surface of the visor and engaging with a first end of a second coupling means, and a drive motor removably attached to the handle bar cover and engaging with a second end of the second coupling means for driving the visor over the at least one guide rail.

The visor assembly further comprises a first end of each of at least two linkage members connected at connecting points on the rear surface of the visor, a third coupling means operably engaged with a second end of the each of the at least two linkage members connecting for applying actuating force on the at least two linkage members, and a drive motor removably attached to the handle bar cover and engaging with the third coupling means for driving the visor over the at least one guide rail using the at least two linkage members.

The visor assembly further comprises at least one linkage member for pivotably attaching the visor to the handle bar cover, and a drive motor removably attached to a rear surface of the handle bar cover and engaging with the at least one linkage member for driving the visor over the at least one guide rail. The drive motor is actuated by at least one of an input switch on the handle bar cover, an input in a user application connected to the vehicle, a voice command to the visor, and a voice command to the display assembly.

The visor of the visor assembly comprises a first display unit displaying at least one of a status of the vehicle and a logo of the vehicle. In an embodiment, the visor of the visor assembly comprises a contactless communication card for authorised entry to the vehicle. The display assembly is accommodated in a cavity of a display enclosure, and the display enclosure is removably attached to the handle bar cover. The display assembly is one of stationary and rotatable configuration wherein the rotatable configuration can rotate from 0 degrees to about 360 degrees. The display enclosure comprises the at least one guide rail on a top surface and wherein the visor assembly slidably engages with the display enclosure.

According to an embodiment of the present invention, a display assembly of a vehicle is disclosed. The display assembly comprising at least one display face is accommodated in a cavity of the handle bar cover. The display assembly comprises a support frame positioned within the cavity of the handle bar cover, at least one display face removably attached to the support frame, and a drive motor rotatably engaged with the support frame to drive the support frame in the cavity of the handle bar cover.

The drive motor is actuated by at least one of an input switch on the handle bar cover, an input in a user application, a voice command to a visor of the vehicle, and a voice command to the display assembly. The display assembly comprises a cable router on at least one side of the support frame for routing a plurality of cables extending from the at least one display face of the support frame, and a closure member removably attached to the cable router for sealing the plurality of cables. At least one display face of the display assembly is an analog instrument panel, a digital instrument panel, an electronic instrument cluster, an infotainment unit, and a vehicle body element.

At least one display face of the display assembly is configured in one of flush and offset manner with a top surface of the handle bar cover. In the embodiment with the at least one display face of the display assembly being offset from the top surface of the handle bar cover, a guiding and sealing member is positioned proximal to edges of the cavity of the handle bar cover. In an embodiment, the display assembly is accommodated in a cavity of a display enclosure, and the display enclosure is removably attached to the handle bar cover. The support frame of the display assembly is one of stationary and rotatable configuration wherein the rotatable configuration can rotate from 0 degrees to about 360 degrees.

The present subject matter is further described with reference to accompanying figures. It should be noted that the description and figures merely illustrate principles of the present subject matter. Various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

FIGS. 1A-IC exemplarily illustrate perspective views of a handle bar assembly 100 of a vehicle (not shown). The handle bar assembly 100 comprises a handle bar crown, a left handle bar and a right handle bar extending in opposite directions from the handle bar crown. Each of the left handle bar and the right handle bar comprises a grip 102*a*, 103*a*, a brake lever 102*b*, 103*b*, and a cluster of plurality of switches 104. The grip 102*a* of the right handle bar may be used as a throttle grip. Further, the handle bar assembly 100 comprises a handle bar cover 101. In an embodiment, the handle bar cover 101 may be in two pieces: a front handle bar cover mounted from the front of the vehicle and the rear handle bar cover proximal to the rider of the vehicle. The front handle bar cover comprises provisions to house the headlamp assembly and/or the turn signal indicators. The rear handle bar cover substantially encloses the left handle bar, the right handle bar, and the handle bar crown and extends till the grip 102*a*, 103*a* of each of the handle bars. The cluster of switches 104 is disposed on the top surface of the handle bar cover 101. The handle bar cover 101 further has provisions to mount the rear-view mirrors 108, other accessories, and the multi-faceted dashboard assembly 107. The multi-faceted dashboard assembly 107 is accommodated in the handle bar cover 101 in the region between the grips 102*a*, 103*a* of the handle bars.

Figure 1B:
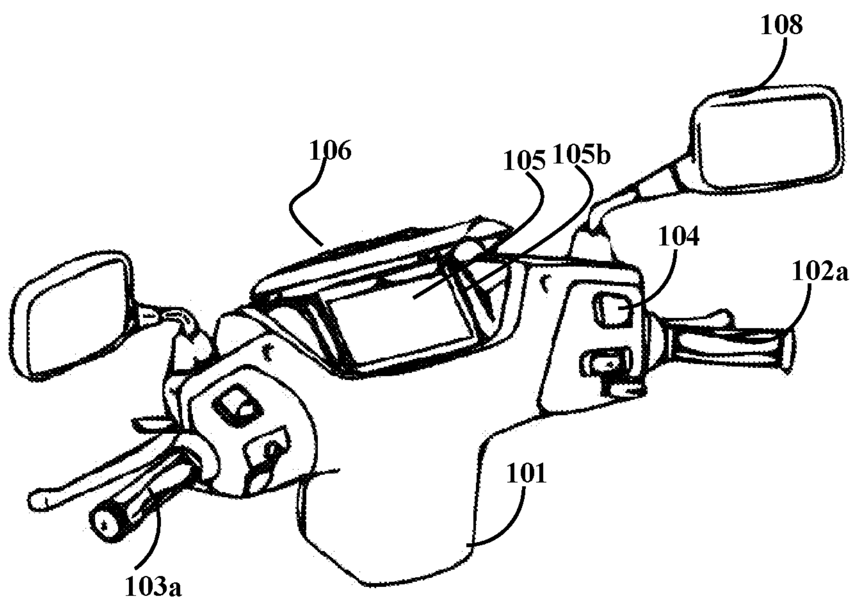
Figure 1C:
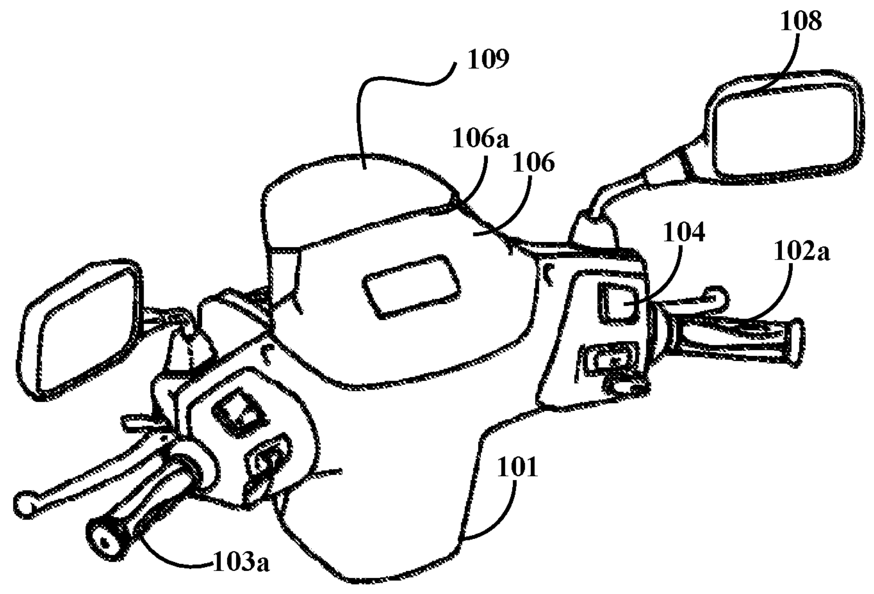

The dashboard assembly 107 comprises a visor assembly 106 slidably engaging with the handle bar cover 101 and a display assembly 105. The display assembly 105 is at least partially exposed to be visible in the cone of vision of the rider by sliding open the visor assembly 106 as exemplarily illustrated in FIGS. 1A-1B. The display assembly 105 is covered by the visor assembly 106 in a closed condition of the visor assembly 106 as exemplarily illustrated in FIG. 1C. The display assembly 105 may have at least one display face 105*a*, 105*b*. The display face 105*a* may be the analog meters as illustrated in FIG. 1A or a display unit 105*b* as illustrated in FIG. 1B. The visor assembly 106 comprises one or more visors 106*a*. In an embodiment, one of the visors may be a stationary visor 109 acting as a windshield of the vehicle and another visor 106*a* may be slidably engaging with the handle bar cover 101. In an embodiment, the visor may be two-part visor as shown in FIG. 1C comprising a stationary section 109 and a movable section 106*a*. In another embodiment, the visor 106*a* may be movable and may slidably engage with the handle bar cover 101. The slidably engaged visor 106*a* may partially or completely cover and uncover the display faces 105*a*, 105*b* of the display assembly 105, as per the preferences of the rider of the vehicle.

Figure 2:
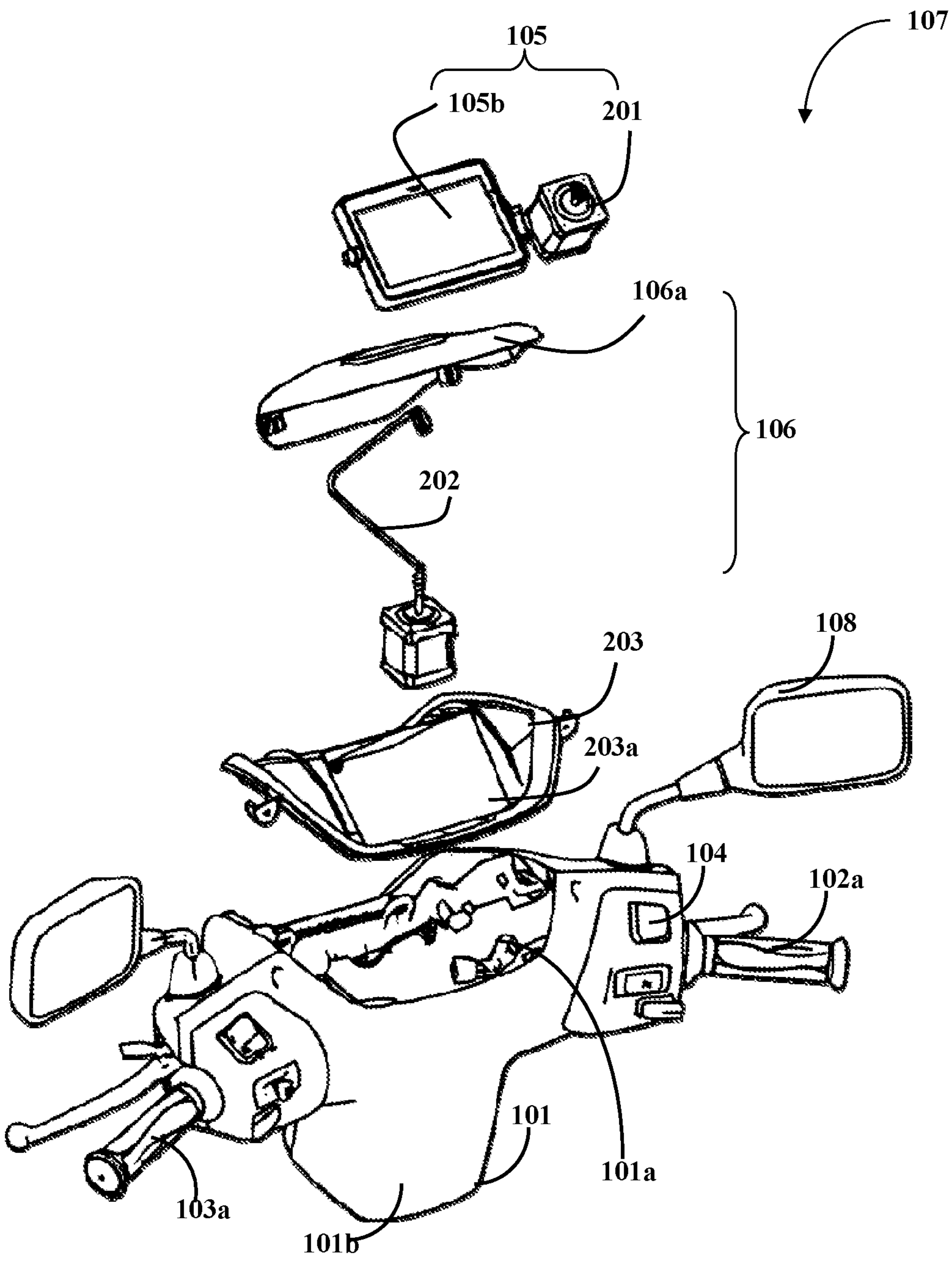
FIG. 2 exemplarily illustrates an exploded view of the multi-faceted dashboard assembly positioned in the handle bar cover.

FIG. 2 exemplarily illustrates an exploded view of the multi-faceted dashboard assembly 107 positioned in the handle bar cover 101. As exemplarily illustrated, the multi-faceted dashboard assembly 107 comprises the visor assembly 106 and the display assembly 105. The visor assembly 106 slidably engages with the handle bar cover 101. The display assembly 105 is located in a cavity 101*a* of the handle bar cover 101. In an embodiment, a display enclosure 203 is removably attached to the handle bar cover 101 and being disposed at the edges of the cavity 101*a*. As used herein, the display enclosure 203 is a vehicle component whose profile conforms to the contour of the handle bar cover 101, in the direction facing the rider of the vehicle. The display enclosure 203 comprises a cavity 203*a* in the centre to accommodate the display assembly 105 as exemplarily illustrated. The visor assembly 106, in this embodiment, slidably engages with the display enclosure 203. The visor assembly 106 comprises the visor 106*a* and the mechanism 202 for the visor 106*a* to slidably engage with the display enclosure 203. The visor 106*a* has a predetermined profile to conform and compliment with the contour of the display enclosure 203 so as to achieve good flush finish in assembled condition. The display assembly 105 comprises at least one display face 105*b*. That is, the display assembly 105 may comprise multiple display faces 105*a*, 105*b* positioned at different angles on a support frame (not shown). The display faces 105*a*, 105*b* may be rotated or stationary. The display assembly 105 thus comprises a mechanism 201 for rotating the display faces 105*a*, 105*b* thereby bringing one of the multiple display faces in line of sight of the rider within the cone of vision. The mechanisms 201, 202 of the display assembly 105 and the visor assembly 106, respectively are housed in the display enclosure 203 or the handle bar cover 101. The display faces 105*a*, 105*b* may be analog meters, digital meters, electronic display units, etc., that display the status of the vehicle, the warnings to the rider, the notifications pertaining to the ride and the rider, etc. The visor 106*a* may at least partially expose or at least partially cover the display faces 105*a*, 105*b* of the display assembly 105, when engaged with the display enclosure 203. In an embodiment, the visor 106*a* may slide and retract into the handle bar cover 101 completely to expose the display assembly 105. The visor 106*a* may slide and retract to form a visor in the vehicle driving condition. In an embodiment, the visor 106*a* of the visor assembly 106 may be in addition to the stationary visor 109 as shown in FIG. 1C or the windshield of the vehicle.

Figure 3A:
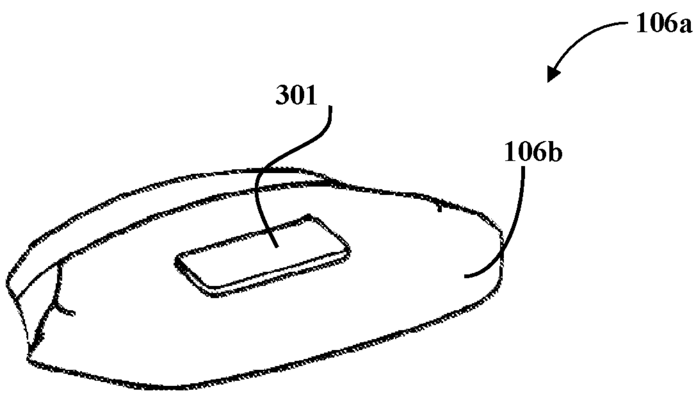
FIGS. 3A-3B exemplarily illustrate perspective views of the visor of the visor assembly.
Figure 3B:
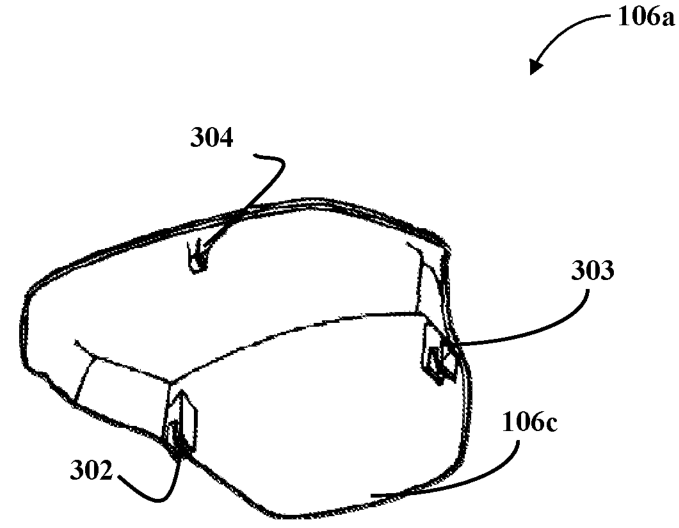

FIGS. 3A-3B exemplarily illustrate perspective views of the visor 106*a* of the visor assembly 106 as per an additional embodiment. FIG. 3A exemplarily illustrates the top perspective view of the visor 106*a*. The top surface 106*b* of the visor 106*a* additionally comprises a first display unit 301. The top surface 106*b* of the visor 106 is visible to the rider, when the visor 106*a* covers the display assembly 106 in the handle bar cover 101. The top display unit 301 may be an analog meter, an electronic or a digital meter, an LCD screen, a LED display, etc. The top display unit 301 may display the speed of the vehicle, vehicle diagnostic information, status of the vehicle, such as, START/STOP condition of the vehicle. The top display unit 301 may display the basic functionalities of the display assembly 105, in the case where the display assembly 105 is covered by the visor 106*a*. The visor 106*a*, as shown in FIG. 3A, is in horizontal orientation in the vehicle. The visor 106*a* slides and retracts to stand vertically to form the visor or the windshield of the vehicle. In an embodiment, the first display unit 301 may be an array of LEDs displaying the logo of the vehicle. The first display unit 301 allows functioning of the vehicle without opening the display assembly 105. In an embodiment, the visor assembly 106 comprises a contactless communication card, such as NFC card, that facilitates keyless authorisation of the rider of the vehicle. The contactless authorisation card may be embedded in the visor 106*a*. At the start of the vehicle, the visor 106*a* may be in the horizontal closed position as shown in FIG. 3A and based on successful keyless authorisation, the visor 106*a* may be allowed to slide and retract to expose the display assembly 105.

FIG. 3B exemplarily illustrates the bottom perspective view of the visor 106*a*. The visor 106*a* comprises at least one extension means 302, 303 extending from a rear surface 106*c* for engaging with at least one guide rail on a top surface of the handle bar cover 101. As exemplarily illustrated, on the rear surface 106*c*, the visor 106*a* comprise two extension means 302, 303 on opposite sides to engage with two guide rails. In an embodiment, the visor 106*a* further comprises a first coupling means 304 located in a front portion of the visor 106*a*. In another embodiment, the visor 106*a* comprises two connection means (not shown) at two connecting points on the rear surface 106*c*. The first coupling means 304 or the connection means in the different embodiments of the visor 106*a* constitute the different mechanisms 202 of the visor assembly 106, as described in the detailed description of FIGS. 4A-4B.

Figure 4A:
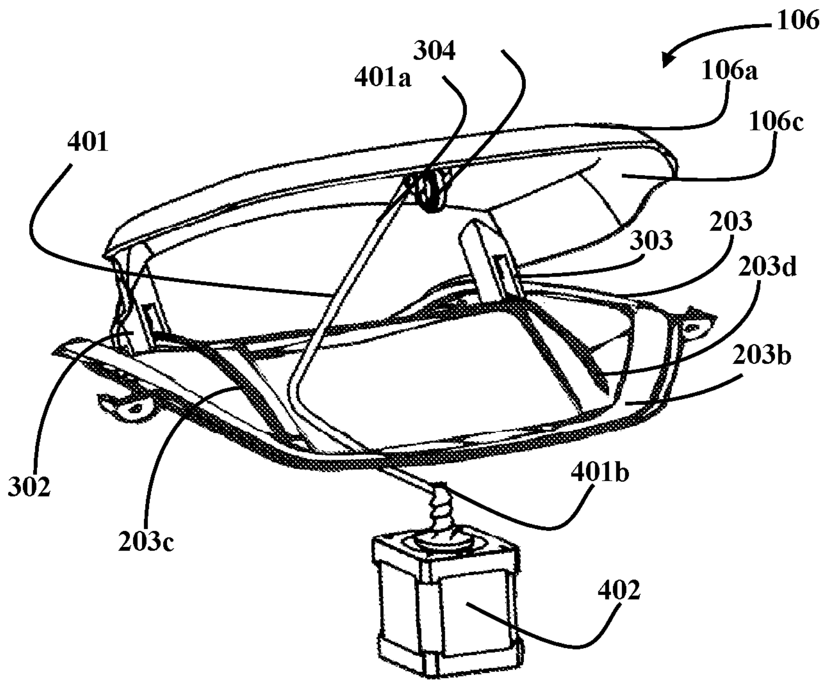
FIGS. 4A-4B exemplarily illustrate front perspective views of different embodiments of the visor assembly.
Figure 4B:
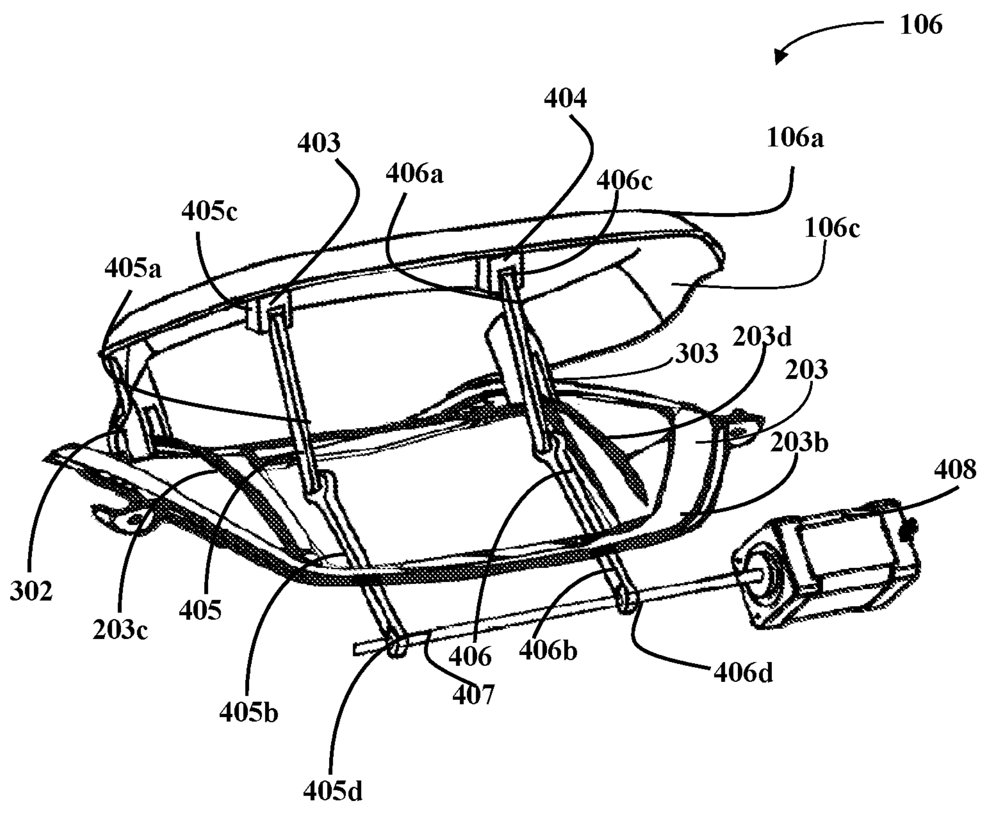

FIGS. 4A-4B exemplarily illustrate front perspective views of different embodiments of the visor assembly 106. In a first embodiment of the visor assembly 106 illustrated in FIG. 4A, the visor 106*a* comprises a first coupling means 304 and two extension means 302, 303 disposed towards lateral ends of the visor 106*a* on the rear surface 106*c*. The visor 106*a* engages with the guide rails 203*c*, 203*d* on the top surface 203*b* of the display enclosure 203. In an embodiment, the guide rails 203*c*, 203*d* may be configured on the top surface 101*b* of the handle bar cover 101 facing the direction of the rider. The guide rails 203*c*, 203*d* direct the movement of the extension means 302, 303 of the visor 106*a*. The guide rails 203*c*, 203*d* are, for example, raised channels, depressed channels, etc. As exemplarily illustrated in FIG. 4A, the guide rails 203*c*, 203*d* are raised channels along the contour of the top surface 203*b* of the display enclosure 203. The extension means 302, 303 on the rear surface 106*c* of the visor 106*a* have raised walls with slots between the walls to engage with the raised channels 203*c*, 203*d* of the display enclosure 203. The first coupling means 304 is a pulley-like structure that engages with a first end 401*a* of a second coupling means 401. The second coupling means 401 may be a flexible member, such as, a wire whose first end 401*a* is wound around the first coupling means 304. A second end 401*b* of the second coupling means 401 is engaged with a shaft of a drive motor 402. The drive motor 402 may be a stepper motor, a servo motor, etc. The drive motor 402 is actuated and the shaft of the motor 402 rotates. The shaft engaged with the second coupling means 401 pulls or pushes the second coupling means 401. In turn, the visor 106*a* is pulled or retracted based on the operation of the drive motor 402 over the guide rail 203*c*, 203*d* of the display enclosure 203 or the handle bar cover 101. In an embodiment, the drive motor 402 may be removably attached to a rear surface of the handle bar cover 101.

In a second embodiment of the visor assembly 106 illustrated in FIG. 4B, the visor 106*a* comprises connection means 403, 404 positioned at predetermined lateral distance apart from each other on the rear surface 106*c*. In an embodiment, the connection means 403, 404 may be located within the two extension means 302, 303. A first end 405*c*, 406*c* of at least two linkage members 405, 406 are connected to the connection means. In an embodiment, each linkage member 405, 406 may be two-part comprising two link members 405*a*, 405*b*; 406*a*, 406*b* connected to each other at one end as exemplarily illustrated. The two link members 405*a*, 405*b*; 406*a*, 406*b* move closer or away from each other, when the linkage members 405, 406 are moved. A second end 405*d*, 406*d* of the linkage members 405, 406 engage with a third coupling means 407. The third coupling means 407 applies force on the linkage members 405, 406 and in turn moves the link members 405*a*, 405*b*; 406*a*, 406*b*. A drive motor 408 engages with the third coupling means 407 and drives the visor 106*a* over the guide rails 203*c*, 203*d* of the display enclosure 203 or the handle bar cover 101. The drive motor 402 of the first embodiment of the visor assembly 106 and the drive motor 408 of the second embodiment of the visor assembly 106 may be actuated by a user input in the switch cluster 104 on the handle bar cover 101, or by an input in a user application on a user device of the rider, or an input to the visor assembly 106, such as, a voice command, gestures, etc., or an input to the display assembly 105, such as, a voice command, gestures, etc.

In an embodiment, the visor assembly comprises at least one linkage member (not shown) for pivotably attaching the visor 106*a* to the handle bar cover 101, and a drive motor removably attached to the rear surface 106*c* of the handle bar cover 101 and engaging with the at least one linkage member for driving the visor 106*a* over the at least one guide rail 203*c*, 203*d*.

Figure 5A:
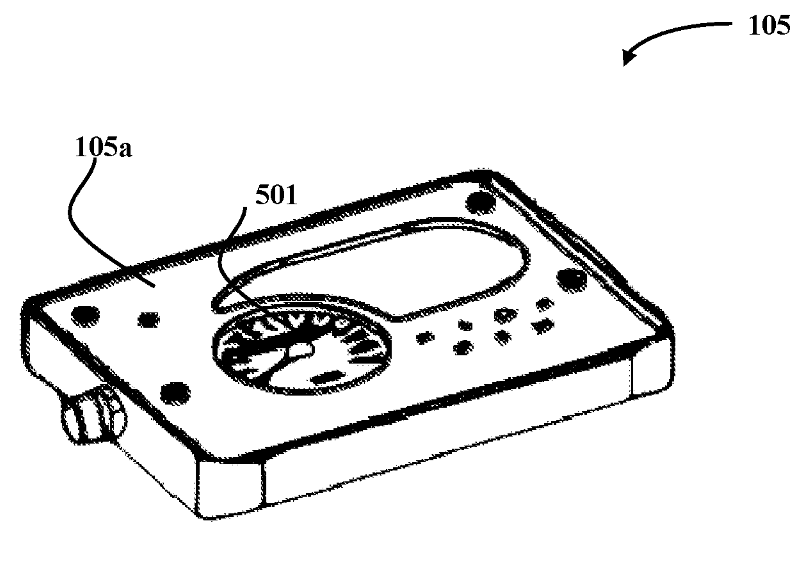
FIGS. 5A-5B exemplarily illustrate perspective views of the display assembly.
Figure 5B:
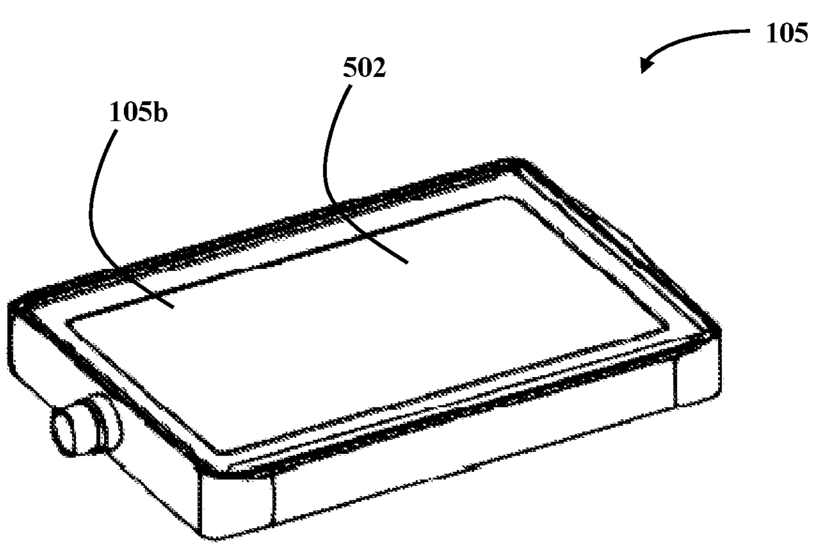

FIGS. 5A-5B exemplarily illustrate perspective views of the display assembly 105. The display assembly 105 comprises at least one display face 105*a*, 105*b*. The display faces may be analog meters 105*a* as shown in FIG. 5A and may be a display unit 105*b* as shown in FIG. 5B. In an embodiment, the display face may be a vehicle body element. That is, the display face may be of the same material and contour as the display enclosure 203 or the handle bar cover 101 of the vehicle. In an embodiment, the display assembly 105 may be stationary. When the display assembly 105 is stationary, one of the display faces 105*a*, 105*b* is displayed in the cavity 203*a*/101*a* of the display enclosure 203 or the handle bar cover 101. The display assembly 105 may be rotatable. In this embodiment, the rider of the vehicle chooses the display face 105*a*, 105*b* to be exposed in the cavity 203*a*/101*a* of the display enclosure 203 or the handle bar cover 101. The display face 105*a* with the analog meters 501 may comprise a speedometer, an odometer, indicators, warning icons, etc. The display face 105*b* with the display unit 502 may be an LCD display panel, a TFT cluster, OLED screen, ELD screen, PDP screen, QLED screen, etc. The display unit 502 may also function as an infotainment unit of the vehicle providing both information and entertainment to the rider. The display unit 502 may be compatible to perform a function based on rider voice command, rider gestures, and provide the rider with navigational guidance, such as, maps, vehicle parameters, such as, speed, distance travelled, distance to the nearest refuelling station, fuel tank level, battery status, mode of functioning of the vehicle, such as, regenerative mode, fuel economy mode, measure of tilt of the bike, warnings on expected crash, notifications on calls, messages, social media, etc. The display unit 502 may have network connectivity, such as, GPS/GSM capability, Bluetooth, Wi-Fi, Li-Fi, CAN capability, etc., and may function on Android, Linux, QNX, or Windows operating systems. The display unit 502 may also display digital version of the analog meters 501 on the other face 105*a* of the display assembly 105. As per another embodiment, the display face 105*b* may have a docketing cavity for the user to docket a personal device like a mobile phone or a tab etc. which enables charging of the personal device and can be additionally configured to operate as a display unit 502 while performing functions like authorisation, app-based diagnostics, vehicle health monitoring, etc.

Figure 6:
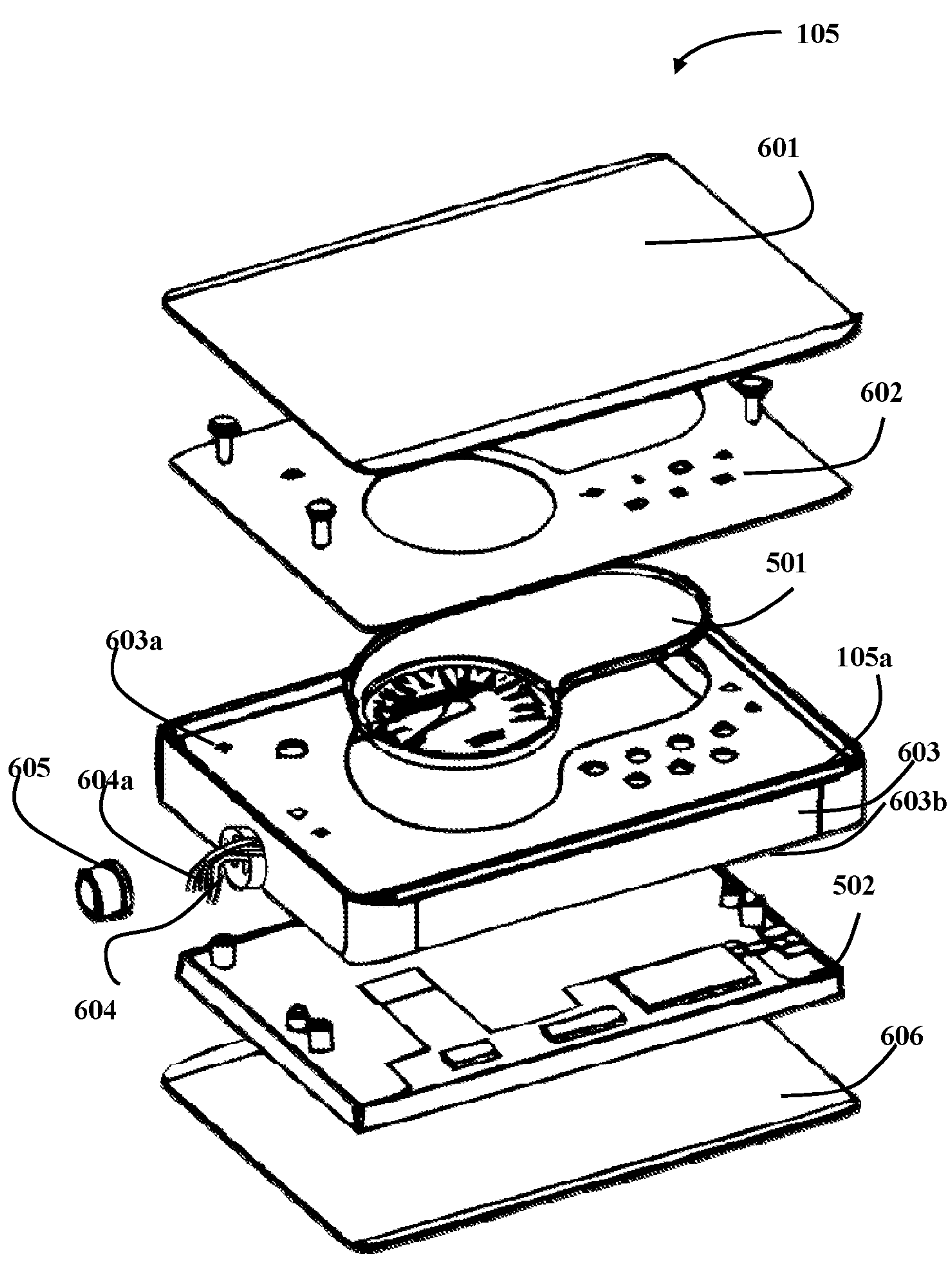
FIG. 6 exemplarily illustrates an exploded view of an embodiment of the display assembly.

FIG. 6 exemplarily illustrates an exploded view of an embodiment of the display assembly 105. The display assembly 105 illustrated is a rotatable display assembly, that is, the display faces 105*a*, 105*b* of the display assembly 105 may be rotated and fixed as per the preference of the rider. The display assembly 105 comprises a support frame 603 and display faces 105*a*, 105*b* removably attached to the support frame 603. The support frame 603 is a frame member whose two opposite surfaces, that is, the top surface 603*a* and the bottom surface 603*b* are formed by the display faces 105*a*, 105*b*. The display faces 105*a* and 105*b* (not shown in this figure), are removably mounted on the support frame 603. The support frame 603 is shown, but not limited, to be rectangular in shape. In an embodiment, the support frame 603 may be three-dimensional in shape, such as, pyramidal, cuboidal, cubical, cylindrical, etc., that can accommodate display faces 105*a*, 105*b* on each of its faces. The support frame 603 may be, but not limited to, a plastic support and may be configured with dimensional adjustment means to conform to the profile of various personal devices of the user.

One of the display faces 105*a* mounted on the support frame 603 is the analog meter 501 as shown in FIG. 5A and the other display face 105*b* mounted on the support frame 603 is a display unit 502 as shown in FIG. 5B. The display faces 105*a*, 105*b* interface with the vehicle sensors and controller using multiple cables. The support frame 603 has provisions to route the cables 604*a* of the display faces 105*a*, 105*b*. The support frame 603 further comprises a cable router 604 on at least one side for routing a plurality of cables 604*a* extending from the display faces 105*a*, 105*b*. The cable router 604 prevents the twisting of the cables 604*a* routed from the support frame 603. The cables 604*a* are routed through a slot (not shown) in the cable router 604 such that the cables 604*a* do not twist, when the support frame 603 rotates and the cable router 604 functions as a pulley around which the cables 604*a* turn. The support frame 603 also supports the rotation mechanism 201 shown in FIG. 2 of the display assembly 105. The display faces 105*a*, 105*b* are assembled onto the support frame 603 and the mounting provisions are hidden by placing an aesthetic element 602, such as an acrylic sheet. Further, on the top of the display faces 105*a*, 105*b*, a cover member 601, 606, such as, a customized glass or an acrylic sheet is positioned. A closure member 605 is removably attached to the cable router 604 for sealing the plurality of cables 604*a*. The closure member 605, for example, a bearing support bush provides a rigid secondary support for rotating and also acts as a securing stopper for the cables routed through the plastic support frame 603.

Figure 7:
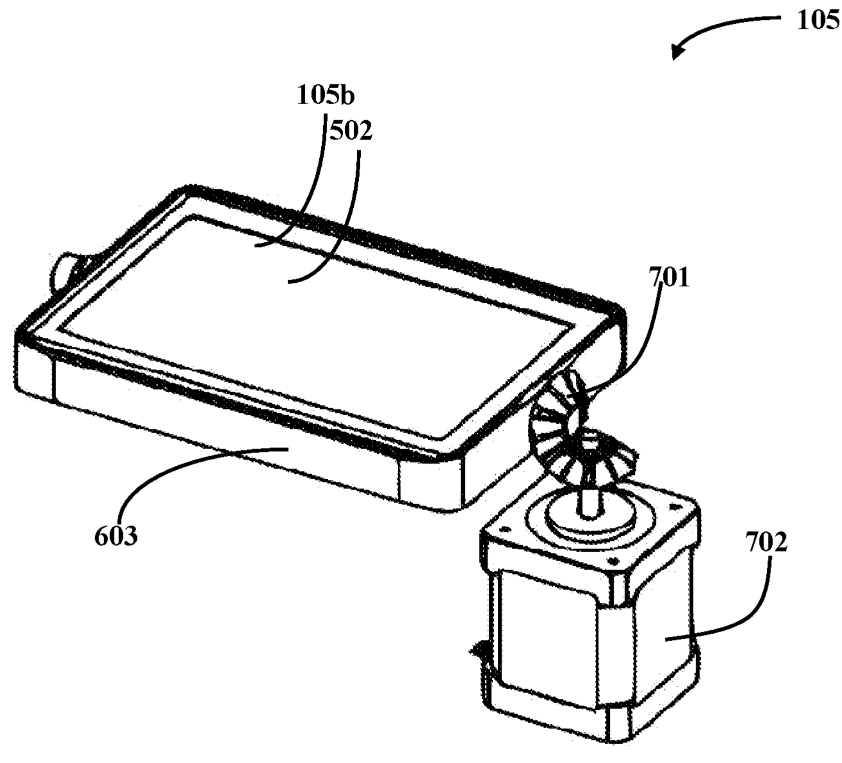
FIG. 7 exemplarily illustrates a perspective view of an embodiment of the display assembly with the rotation mechanism shown in FIG. 2.

FIG. 7 exemplarily illustrates a perspective view of an embodiment of the display assembly 105 with the rotation mechanism 201 shown in FIG. 2. As exemplarily illustrated, the display assembly 105 comprises a drive motor 702 rotatably engaged with the support frame 603 to drive the support frame 603 in the cavity 203*a*/101*a* of the display enclosure 203 or the handle bar cover 101. The support frame 603 comprises an extension 701, such as, a spline, a gear, or any driven feature to be driven by the drive motor 702 on the side opposite to the cable router 604. The support frame 603 may be actuated by the drive motor 702, such as, a servo motor, a stepper motor, connected directly to the support frame 603 or a gear box unit that transmits power from the servo motor to the support frame 603 or a rack and pinion mechanism for linear actuation of the support frame 603, etc. The display faces 105*a*, 105*b* are either flush with or offset from the top surface 101*b* of the handle bar cover 101. In an embodiment, the display face 105*a*/105*b* may be lower than the top surface 203*b*/101*b* of the display enclosure 203 or the handle bar cover 101. The drive motor 702 of the display assembly 105 may be housed within the handle bar cover 101 and the whole of the display assembly 105 is within the cavity 203*a* of the display enclosure 203. The display faces 105*a*, 105*b* mounted on the support frame 603 may be flush or of same height as the top surface 203*b* of the display enclosure 203. In an embodiment, the display faces 105*a*, 105*b* mounted on the support frame 603 may be within the cavity 203*a* of the display enclosure 203. In an embodiment, the top surface 203*b* of the display enclosure 203 or the top surface 101*b* of the handle bar cover 101 may have a guiding and sealing member (not shown) positioned proximal to the edges of the cavity 203*a*/101*a* to seal the gap between the display enclosure 203 and the display face 105*a*/105*b*. The guiding and sealing member may be a packing material, a rubber tube, gasket, etc.

FIGS. 8A-8C exemplarily illustrate different views of an embodiment of the display assembly 105. A sectional view of the cable router 604 of the support frame 603 is shown in FIG. 8A, taken about the axis A-A'. The cables 604*a* from the support frame 603 pertaining to the different display faces 105*a*, 105*b* are routed through the cable routing slot 801 of the router 604. The slot 801 in the router 604 faces upwards away from the rider of the vehicle. The cables 604*a* are pulled through the slot 801 in the upward direction, as the support frame 603 with the display faces 105*a*, 105*b* is rotated by the actuation of the drive motor 702. The orientation of the cables 604*a* from the slot 801 in the router 604 results in free rotation of the support frame 603 and no tangling and twisting of the cables 604*a* with the 0-360 degrees rotation of the support frame 603. On the side of the support frame 603, opposite to the router 604, the drive feature 701, such as, the spline is provided as shown in FIG. 8C. The rotatable display assembly 105 in this embodiment is shown to have analog meters 501 as shown in FIG. 8B as one display face 105*a* and a display unit 502 as another display face 105*b*. In an embodiment, one display face 105*a* may be analog meters 501 or a display unit 502 and the opposite display face 105*b* may be a vehicle body element. The display faces 105*a*, 105*b* are selected by the rider of the vehicle, based on his/her preference. The actuation of the drive motor 702 of the display assembly 105 may be by an input switch on the handle bar cover 101, an input in a user application connected to the vehicle, a voice command to the visor 106*a*, or a voice command to the display assembly 105.

Figure 9A:
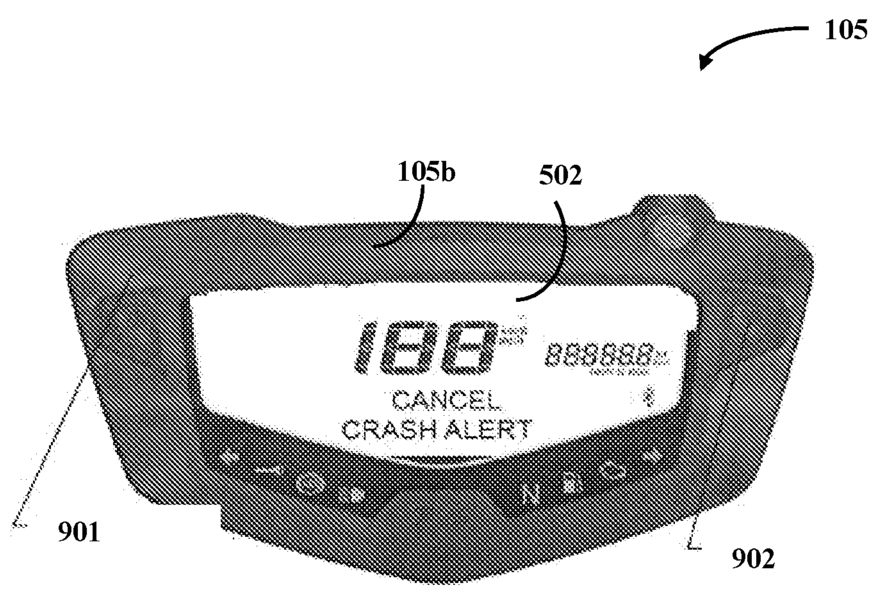
FIGS. 9A-9B exemplarily illustrate a display face of the display assembly and a plurality of actuation inputs.
Figure 9B:
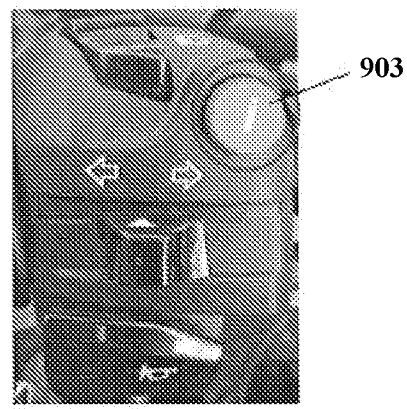

FIGS. 9A-9B exemplarily illustrate an embodiment of a display face 105*b* of the display assembly 105 and a plurality of actuation inputs 901, 902, 903. The display face 105*b* may be a display unit 502 with push switches 901, 902 on the frame of the display unit 502 as exemplarily illustrated. The display unit 502 may communicate with the vehicle sensors and controllers of the vehicle and display a crash alert on its display interface. The push switches 901, 902 on the frame of the support unit may be actuated to cancel the crash alert displayed on the display interface. In an embodiment, an input 903 in the plurality of switches 104 on the handle bar cover 101 may be used to cancel the crash alert.

Figure 10A:
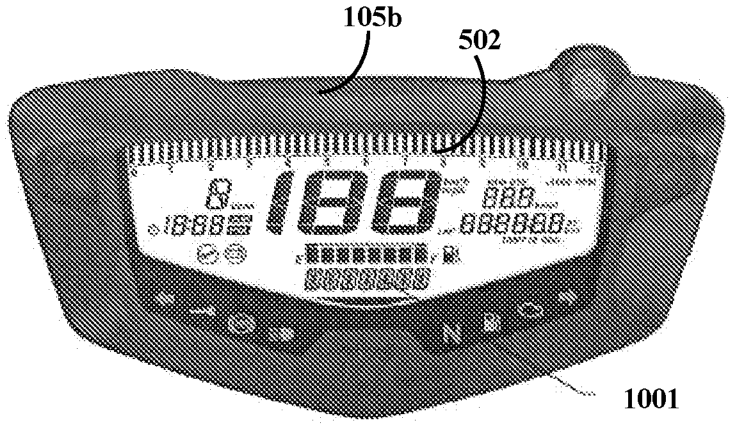
FIGS. 10A-10B exemplarily illustrates a display face of the display assembly.
Figure 10B:
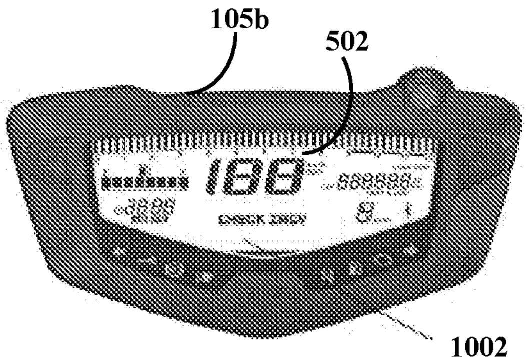

FIGS. 10A-10B exemplarily illustrate another embodiment of a display face 105*b* of the display assembly 105. The display face 105*b* may be a display unit 502 displaying diagnostic information of the vehicle. In an embodiment, the diagnostic information may be displayed as alphanumeric codes 1001, where each code has a specific meaning as listed in the manual of the vehicle. In an embodiment, the diagnostic information may be displayed in dot matrix representation 1002 clearly identifying the issue in the vehicle parts as shown in FIG. 10B.

The embodiments of the multifaceted dashboard assembly with the display assembly and the visor assembly provides a technical advancement in the field of instrument cluster in the vehicle as follows: The visor of the visor assembly slidably engages with the handle bar cover and the visor covers or exposes the display faces to sunlight. The display faces are thus protected from continuous exposure to sunlight, even in the vehicle parked condition. The visor also protects glare from occurring on the display faces in the line of sight of the rider, providing convenience in readability and accessibility of the visor assembly. The visor being closed in a user chosen closeted condition e.g. when parked, protects the display faces from dust accumulation and rain. The visor also functions as a windshield in the retracted position, thereby affecting the aero dynamics of the vehicle and protecting the display faces from any striking particles, such as, insects, gravel, etc. The visor assembly comprises a contactless card, such as, the NFC card that allows keyless contact less authorisation of the vehicle, providing convenience to the rider. The first display unit on the top surface of the visor aids in normal functioning of the vehicle, in case the visor assembly malfunctions thereby achieving a failsafe mode for the vehicle. This aids in taking the vehicle for servicing without any hindrance, by driving the vehicle a minimal distance without the visor being opened. Also, the first display unit is aesthetic appealing and ergonomically placed to display the status of the vehicle, such as, the speed of the vehicle, the vehicle ON/OFF status, etc. The first display unit can also be used for branding of the vehicle, with the logo on it. Also, the NFC card is ergonomically placed in the visor to be within the reach of variety of riders. The actuation of the visor assembly by different means requires no manual interference from the rider causing no distraction to the rider in the course of ride. Also, the means for engaging the visor assembly with the handle bar cover is simple and easy to manufacture with sufficient tolerance to accommodate production variance.

The display assembly is positioned within the cavity of the handle bar cover or the display enclosure. The display faces are flush with the top surface of the handle bar cover, making the dashboard assembly aesthetically appealing and ergonomically positioned to interact by the rider. The display assembly is rotatable that facilitates the positioning of the display faces as required by the user and selecting the display face as per the preference of the rider. The display faces may be slightly titled to prevent glare that hinders visibility and readability of the display faces. The position of the display assembly may be decided by the rider of the vehicle and actuated by using a plurality of means, without requiring manual interference. The display faces are mounted on the support frame making display assembly modular and customisable, as per the requirement of the different category of riders, such as young and old. The cable router of the display assembly also facilitates rotation of the display faces, without tangling and twisting of the cable, which otherwise is a nuisance and may lead to loss in connectivity of the display assembly with vehicle parts. The closure member on top of the cable router arrests the cables from falling off from the slot in the cable router. The option of the second display face being an infotainment unit addresses the need for entertainment of the rider and appealing user interface for the rider e.g. in case of prolonged parking. The display assembly when hidden or in closeted mode in the parking conditions of the vehicle also is theft deterrent.

The drive mechanisms for both the display assembly and the visor assembly are all modular, making the assembly, maintenance, and servicing of the assemblies less cumbersome and less time consuming. The display faces and the visor by means of the steeper motor may be positioned at different desired angles, without any manual intervention. As the visor is capable of undergoing both rotary and linear movement, a cam groove is made in a fixed part in vehicle. The visor has a follower when is guided through the cam groove when actuated by a stepper motor through a 2-bar link mechanism (as the distance from the centre to the groove vanes place to place). Since the mechanisms of the display assembly and the visor assembly are modular, they may be retrofit or custom fit in existing vehicles, to address different needs. Also, the mechanisms for the display assembly and the visor assembly for mechanical actuation of the display faces and also the visor may be rack and pinion, belts, chains or pulleys, etc.

The dashboard assembly disclosed may be implemented in any vehicle, a two-wheeled vehicle, a three wheeled vehicle, a multi-wheeled vehicle, such as, car, bus, truck, train, etc., ships, and aeroplanes. The combination of the display assembly and the visor assembly results in a safe ride of the rider, aesthetically appealing, modular, resulting in ease in manufacture, assembling, maintenance, of the vehicle and improved durability of the vehicle.

Improvements and modifications may be incorporated herein without deviating from the scope of the invention.

LIST OF REFERENCE NUMERALS

100—handle bar assembly of a vehicle
101—handle bar cover
101*a*—cavity in handle bar cover
101*b*—top surface of the handle bar cover
102*a*—right handle bar grip
102*b*—right handle bar brake lever

103*a*—left handle bar grip
103*b*—left handle bar brake lever
104—cluster of switches
105—display assembly
105*a*, 105*b*—display faces
106—visor assembly
106*a*—visor
106*b*—top surface of the visor
106*c*—bottom surface of the visor
107—multi-faceted dashboard assembly
108—rear view mirror
109—stationary visor
201—rotating mechanism of the display assembly
202—rotating mechanism of the visor assembly
203—display enclosure
203*a*—cavity of the display enclosure
203*b*—top surface of the display enclosure
203*c*, 203*d*—guide rails of display enclosure
301—first display unit
302, 303—extension means of the visor
304—first coupling means of the visor
401—second coupling means
402—drive motor of the visor assembly
403, 404—extension means
405, 406—linkage members
405*a*, 405*b*—link members
406*a*, 406*b*—link members
405*c*, 406*c*—first end of the link members
405*d*, 406*d*—second end of the link members
407—third coupling means
408—drive motor of the display assembly
501—analog meter
502—display unit
601, 606—cover member
602—acrylic sheet
603—support frame
603*a*—top surface of the support frame
603*b*—bottom surface of the support frame
604—cable router
604*a*—cables
605—closure member
701—extension of the support frame
702—drive motor of the display assembly
801—slot in the cable router
901, 902, 903—actuation inputs of the display unit
1001, 1002—representation of the diagnostic information

We claim:

1. A multi-faceted dashboard assembly for a vehicle comprising:

a visor assembly slidably engaging with a handle bar cover of the vehicle, and a display assembly comprising at least one display face accommodated in a cavity of the handle bar cover, wherein the visor assembly comprises:

at least one visor of a predetermined profile for one of at least partially covering and at least partially exposing the display assembly, and at least one extension means extending from a rear surface of the visor for engaging with at least one guide rail on a top surface of the handle bar cover.

2. The multi-faceted dashboard assembly of claim 1, wherein the visor assembly further comprises:

a first coupling means extending from the rear surface of the visor and engaging with a first end of a second coupling means, and a drive motor removably attached to a rear surface of the handle bar cover and engaging with a second end of the second coupling means for driving the visor over the at least one guide rail.

3. The multi-faceted dashboard assembly of claim 2, wherein the drive motor is actuated by at least one of an input switch on the handle bar cover, an input in a user application, a voice command to the visor, and a voice command to the display assembly.

4. The multi-faceted dashboard assembly of claim 1, wherein the visor assembly further comprises:

a first end of each of at least two linkage members connected to connection means on the rear surface of the visor, a third coupling means operably engaged with a second end of the each of the at least two linkage members connected for applying actuating force on the at least two linkage members, and a drive motor removably attached to a rear surface of the handle bar cover and engaging with the third coupling means for driving the visor over the at least one guide rail using the at least two linkage members.

5. The multi-faceted dashboard assembly of claim 1, wherein the visor assembly further comprises:

at least one linkage member for pivotably attaching the visor to the handle bar cover, and a drive motor removably attached to a rear surface of the handle bar cover and engaging with the at least one linkage member for driving the visor over the at least one guide rail.

6. The multi-faceted dashboard assembly of claim 1, wherein the visor of the visor assembly comprises a first display unit displaying at least one of a status of the vehicle and a logo of the vehicle.

7. The multi-faceted dashboard assembly of claim 1, wherein the visor of the visor assembly comprises a contactless communication card for authorised entry to the vehicle.

8. The multi-faceted dashboard assembly of claim 1, wherein the display assembly comprises:

a support frame positioned within the cavity of the handle bar cover, at least one display face removably attached to the support frame, and a drive motor rotatably engaged with the support frame to drive the support frame in the cavity of the handle bar cover.

9. The multi-faceted dashboard assembly of claim 8, wherein the drive motor is actuated by at least one of an input switch on the handle bar cover, an input in a user application connected to the vehicle, a voice command to the visor, and a voice command to the display assembly.

10. The multi-faceted dashboard assembly of claim 8, wherein the display assembly comprises:

a cable router on at least one side of the support frame for routing a plurality of cables extending from the at least one display face of the support frame, and a closure member removably attached to the cable router for sealing the plurality of cables.

11. The multi-faceted dashboard assembly of claim 8, wherein the at least one display face is at least one of an analog instrument panel, a digital instrument panel, an electronic instrument cluster, an infotainment unit, a vehicle body element, and a vehicle body element with a docketing cavity.

12. The multi-faceted dashboard assembly of claim 8, wherein the at least one display face is configured to be mounted in one of flush layout and offset with a top surface of the handle bar cover.

13. The multi-faceted dashboard assembly of claim 12, wherein the at least one display face is offset with the top surface of the handle bar cover, a guiding and sealing member is positioned proximal to edges of the cavity of the handle bar cover.

14. The multi-faceted dashboard assembly of claim 1, wherein the display assembly is accommodated in a cavity of a display enclosure, and wherein the display enclosure is removably attached to the handle bar cover.

15. The multi-faceted dashboard assembly of claim 14, wherein the display enclosure comprises the at least one guide rail on a top surface and wherein the visor assembly slidably engages with the display enclosure.

16. The multi-faceted dashboard assembly of claim 1, wherein the display assembly is configured to be one of stationary and rotatable manner further wherein said rotatable configuration is capable of rotation from 0 degrees to about 360 degrees.

17. A visor assembly of a vehicle, the visor assembly slidably engaging with a handle bar cover of the vehicle, the visor assembly comprising:

at least one visor of a predetermined profile for one of at least partially covering and at least partially exposing a display assembly positioned in the handle bar cover, and at least one extension means extending from a rear surface of the visor for engaging with at least one guide rail on a top surface of the handle bar cover.

18. The visor assembly of claim 17, further comprising:

a first coupling means extending from the rear surface of the visor and engaging with a first end of a coupling means, and a drive motor removably attached to the handle bar cover and engaging with a second end of the second coupling means for driving the visor over the at least one guide rail.

19. The visor assembly of claim 18, wherein the drive motor is actuated by at least one of an input switch on the handle bar cover, an input in a user application connected to the vehicle, a voice command to the visor, and a voice command to the display assembly.

20. The visor assembly of claim 17, further comprising:

a first end of each of at least two linkage members connected at connecting points on the rear surface of the visor, a third coupling means operably engaged with a second end of the each of the at least two linkage members connecting for applying actuating force on the at least two linkage members, and a drive motor removably attached to the handle bar cover and engaging with the third coupling means for driving the visor over the at least one guide rail using the at least two linkage members.

21. The visor assembly of claim 17, further comprising:

at least one linkage member for pivotably attaching the visor to the handle bar cover, and a drive motor removably attached to a rear surface of the handle bar cover and engaging with the at least one linkage member for driving the visor over the at least one guide rail.

22. The visor assembly of claim 17, wherein the visor of the visor assembly comprises a first display unit displaying at least one of a status of the vehicle and a logo of the vehicle.

23. The visor assembly of claim 17, wherein wherein the visor of the visor assembly comprises a contactless communication card for authorised entry to the vehicle.

24. The visor assembly of claim 17, wherein the display assembly is accommodated in a cavity of a display enclosure, and wherein the display enclosure is removably attached to the handle bar cover.

25. The visor assembly of claim 24, wherein the display enclosure comprises the at least one guide rail on a top surface and wherein the visor assembly slidably engages with the display enclosure.

26. The visor assembly of claim 17, wherein the display assembly is one of stationary and rotatable wherein for a rotatable configuration, the rotation being enabled from 0 degrees to about 360 degrees.

27. A display assembly of a vehicle, the display assembly comprising at least one display face accommodated in a cavity of a handle bar cover, the display assembly comprising:

a support frame positioned within the cavity of the handle bar cover;

at least one display face removably attached to the support frame;

a drive motor rotatably engaged with the support frame to drive the support frame in the cavity of the handle bar cover;

a cable router on at least one side of the support frame for routing a plurality of cables extending from the at least one display face of the support frame; and a closure member removably attached to the cable router for sealing the plurality of cables.

28. The display assembly of claim 27, wherein the drive motor is actuated by at least one of an input switch on the handle bar cover, an input in a user application, a voice command to a visor of the vehicle, and a voice command to the display assembly.

29. The display assembly of claim 27, wherein the at least one display face is an analog instrument panel, a digital instrument panel, an electronic instrument cluster, an infotainment unit, a vehicle body element, and a vehicle body element with a docketing cavity.

30. The display assembly of claim 27, wherein the at least one display face is one of flush and offset with a top surface of the handle bar cover.

31. The display assembly of claim 30, wherein the at least one display face is offset with the top surface of the handle bar cover, a guiding and sealing member is positioned proximal to edges of the cavity of the handle bar cover.

32. The display assembly of claim 27, wherein the display assembly is accommodated in a cavity of a display enclosure, and wherein the display enclosure is removably attached to the handle bar cover.

33. The display assembly of claim 27, wherein the support frame of the display assembly is one of stationary and rotatable configuration, and wherein for a rotatable configuration, the rotation being enabled from 0 degrees to about 360 degrees.

* * * * *